(12) United States Patent
Martin et al.

(10) Patent No.: US 12,326,591 B2
(45) Date of Patent: Jun. 10, 2025

(54) SHAPED PART

(71) Applicant: Novem Car Interior Design GmbH, Vorbach (DE)

(72) Inventors: Alexander Martin, Neuhaus an der Pegnitz (DE); Philipp Weih, Haag (DE)

(73) Assignee: Novem Car Interior Design GmbH, Vorbach (DE)

( * ) Notice: Subject to any disclaimer, the term of this patent is extended or adjusted under 35 U.S.C. 154(b) by 0 days.

(21) Appl. No.: 18/440,887

(22) Filed: Feb. 13, 2024

(65) Prior Publication Data
US 2024/0295687 A1 Sep. 5, 2024

(30) Foreign Application Priority Data
Feb. 16, 2023 (DE) .......................... 102023103809.5

(51) Int. Cl.
*F21V 8/00* (2006.01)
(52) U.S. Cl.
CPC ............. *G02B 6/006* (2013.01); *G02B 6/005* (2013.01)
(58) Field of Classification Search
CPC ..... G02B 6/0036; G02B 6/006; G02B 6/0016
See application file for complete search history.

(56) References Cited

U.S. PATENT DOCUMENTS

| | | | | |
|---|---|---|---|---|
| 2008/0180584 A1* | 7/2008 | Zhang | ................. | H10K 59/40 |
| 2014/0098332 A1* | 4/2014 | Kim | ................. | G02F 1/133514 438/30 |
| 2016/0358997 A1* | 12/2016 | Bae | ................. | G02F 1/133512 |
| 2018/0370195 A1* | 12/2018 | Laluet | ................. | G02B 27/0101 |
| 2024/0224691 A1* | 7/2024 | Zhang | ................. | H10K 59/40 |

FOREIGN PATENT DOCUMENTS

| | | |
|---|---|---|
| DE | 202019005317 | 3/2020 |
| DE | 102021200379 | 7/2022 |
| EP | 2686203 | 7/2019 |

* cited by examiner

*Primary Examiner* — Fatima N Farokhrooz
(74) *Attorney, Agent, or Firm* — Workman Nydegger

(57) ABSTRACT

A shaped part can include a decorative layer having a front side and a rear side, which is opaque except for light-transmissive recesses, and at least one light element which emits light onto the rear side of the decorative layer. The recesses comprise a first and second recess, where the first recess is filled with a first color and/or covered on the rear side of the decorative layer with a first color layer formed by the first color, and the second recess is filled with a second color and/or covered on the rear side of the decorative layer with a second color layer formed by the second color, The light element (24) can emit at least one first and one second light color, wherein the wavelength spectrum of the first light color differs from the wavelength spectrum of the second light color.

11 Claims, 1 Drawing Sheet

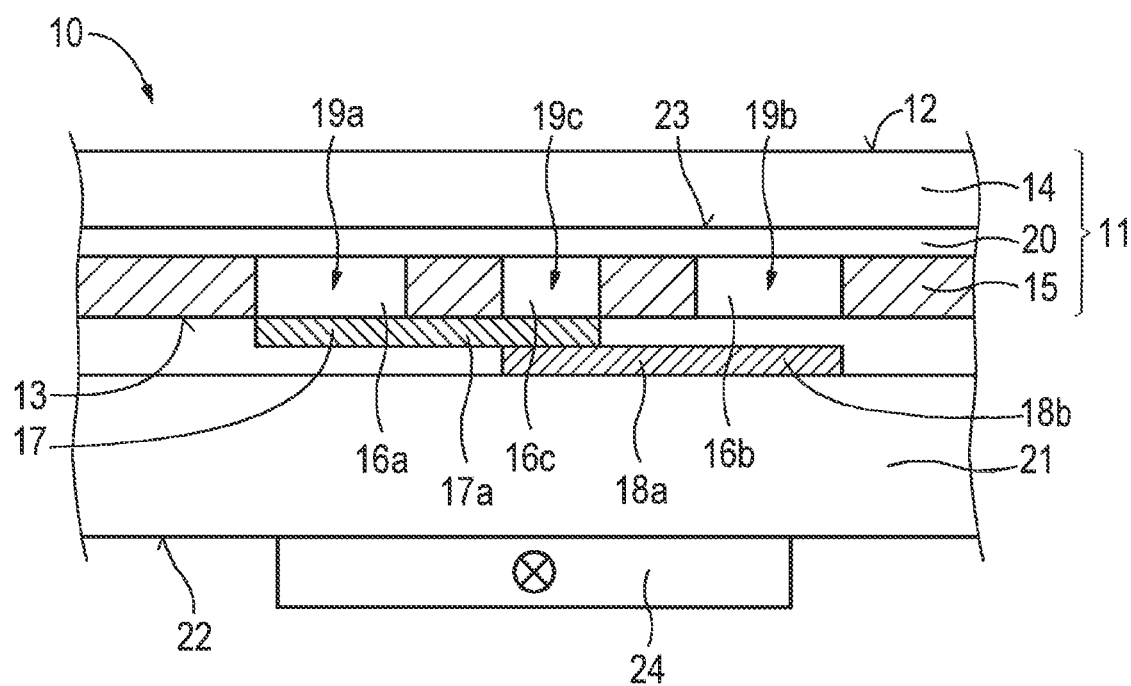

SHAPED PART

CROSS-REFERENCE TO RELATED APPLICATIONS

The present invention claims priority to DE 102023103809.5, filed on Feb. 16, 2023. The entire content of each of the aforementioned patent applications is incorporated herein by reference.

BACKGROUND OF THE INVENTION

1. Field of the Invention

The invention relates to a shaped part, in particular a decorative part (also: body trim part) and/or panel part designed as a shaped part for a vehicle interior.

2. The Relevant Technology

Numerous decorative and panel parts are installed in the vehicle interior, for example door panels, console panels, and instrument panels. The decorative and panel parts also include control buttons and their covers.

Known from DE 20 2016 104 031 U1 are shaped parts comprising rear light elements that backlight light-transmissive recesses in a decorative layer and thus make the lines formed by the recesses visible to a viewer, even at night.

The requirements for such shaped parts are continuously increasing; in particular there is a need for shaped parts with which many optical light effects can be realized on the visible side.

BRIEF SUMMARY OF THE INVENTION

The object of the invention is to specify a new shaped part, in particular a shaped part which has a modifiable light design.

This object is achieved by a shaped part having the features of claim 1. Advantageous embodiments and further developments are provided in the dependent claims.

The shaped part according to the invention comprises a decorative layer having a front side designed as a visible side and a rear side opposite the front side. The decorative layer is designed to be opaque except for light-transmissive recesses in the decorative layer for light impinging on the rear side of the decorative layer. The shaped part further comprises at least one light element which emits light onto the rear side of the decorative layer for illuminating the light-transmissive recesses of the decorative layer. Light-transmissive recesses are in particular understood to mean light passages in an opaque surrounding area which allow a transmitting of the light impinging on the rear side of the decorative layer to the front side of the decorative layer. For this purpose, the light-transmissive recesses do not necessarily have to extend through the entire decorative layer, but rather it is sufficient if the light-transmissive recesses extend through an opaque region of the decorative layer and the light can cover the other path through the decorative layer through transparent or light-transmissive regions of the decorative layer. In particular, a longitudinal axis of the corresponding light-transmissive recess can extend perpendicular to the rear side of the decorative layer.

The invention provides that the light-transmissive recesses comprise at least one first light-transmissive recess and at least one second light-transmissive recess. The light-transmissive recesses can be, for example, recesses visible to an observer. However, this can also be, for example, a microperforation, where a microperforation is understood to mean a perforation which is not visible to an observer in a non-backlit state, i.e., is not distinguishable or is hardly distinguishable from a non-microperforated region.

The at least one first light-transmissive recess is filled with a first color and/or covered on the rear side of the decorative layer with a first color layer formed by the first color, so that the at least one first light-transmissive recess forms a first color filter for light impinging on the rear side of the decorative layer.

The at least one second light-transmissive recess is filled with a second color and/or covered with a second color layer formed by the second color on the rear side of the decorative layer, so that the at least one second light-transmissive recess forms a second color filter for light impinging on the rear side of the decorative layer. The first color and second color here are two different colors. Accordingly, the first color filter and the second color filter differ with respect to the wavelength spectrum that is blocked or let through thereby and thus with respect to their light transmission for radiated light.

The light element is a dual- or multispectral light element which can emit at least one first light color and at least one second light color, wherein the wavelength spectrum of the first light color differs from the wavelength spectrum of the second light color. A light color is defined in particular by its wavelength spectrum, i.e., by the spectral composition of the light. The wavelength spectrum can be composed, for example, of discrete individual spectral colors of a specific wavelength and/or of a light mixture of a plurality of wavelengths or wavelength ranges and/or of a continuous spectral range. In particular, the intensity distribution over the wavelengths of the spectrum is characteristic of the corresponding light color. The light color can be changed by filtering. The filtering can be effected by a color filter, wherein a color filter, for example, selectively absorbs or lets through certain colors from the wavelength spectrum of the light; that is to say, a color filter can change the color spectrum of the light and thus the light color.

According to the invention, it is furthermore provided that the light transmission of the first color filter is greater for the first light color than for the second light color, and the light transmission of the second color filter is greater for the second light color than for the first light color. Furthermore, it can be provided that the light transmissions of the first color filter and of the second color filter additionally also differ from one another for further light colors.

In particular, the first color filter of the at least one first light-transmissive recess thus transmits primarily the first light color, whereas the second light color can be seen to a significantly weaker degree or not at all through the first color filter, and the second color filter of the at least one second light-transmissive recess transmits the second light color in particular, whereas the first light color can be seen to a significantly weaker degree or not at all through the second color filter. In the case of radiation of the first light color, primarily or exclusively the at least one first recess is thus visible in the first light color, that is to say the at least one first recess lights up in the first light color. In the case of radiation of the second light color, in particular or exclusively the at least one second recess is by contrast visible in the second light color, that is to say the at least one second recess lights up in the second light color.

The color layers can be, for example, colored printed layers, for example screen-printed layers, and/or colored lacquer layers and/or colored films.

The dual- or multispectral light element can be a light element having an adjustable wavelength spectrum which is emitted by the light element, i.e., a light element with a variable light color. The light source for the light emitted by the light element can be RGB LEDs, for example, which are made up of diodes for the primary colors red, green and blue and can therefore light up in different selectable light colors depending on how the red, green and blue diodes are controlled. For example, it can be provided that white light can also be emitted by the light element.

The light element can be arranged on the rear side of the decorative layer. The light element can be, for example, a flat light element. The light element itself can comprise one or more light sources. For example, these light sources can be arranged on the rear side of the decorative layer. The light element may also be an, in particular flat, light guide or may comprise it. The light is radiated into this light guide from a light source, for example RGB LEDs, arranged elsewhere. The, in particular flat, light guide can extend, for example, on the rear side of the decorative layer, and the light is radiated laterally into the light guide. The light sources, for example RGB LEDs, can thus be arranged, for example, laterally on this light guide, radiate light laterally into the light guide, and the light guide radiates the light onto the rear side of the decorative layer for illuminating the light-transmissive recesses of the decorative layer. The light guide can be a light-conducting layer of the shaped part, for example a transparent or translucent carrier on the rear side of the decorative layer.

The advantages of the invention lie in particular in the fact that two or more different symbols and/or decorations on the visible side of the shaped part can be displayed individually or together simply by changing the light color of the light element. Depending on the light color, symbols and/or decorations can thus be made visible or masked out, for example. For example, symbols and/or decorations can be represented by a red first light color, which symbols and/or decorations are formed by first light-transmissive recesses, which are filled with red color or covered with a red color layer. On the other hand, the red first light color masks out symbols and/or decorations that are formed by second light-transmissive recesses that are filled with blue color or covered with a blue color layer, for example. In contrast, in a blue second light color, the symbols and/or decorations are shown which are formed by the second light-transmissive recesses, which are filled with blue color or covered with a blue color layer. On the other hand, the blue second light color masks out symbols and/or decorations that are formed by the first light-transmissive recesses that are filled with red color or covered with a red color layer, for example. In the case of light mixtures or other light colors, both aforementioned variants of symbols and/or decorations can be represented in different light intensities and/or hues. By corresponding variation of the light color generated by the light element, changing designs can thus be realized on the front side of the decorative layer. The shaped part has a changeable light design.

It is thus possible with the invention to bring about a change in the symbols and/or decorations shown on the visible side of the shaped part by changing the light color of the light element. For example, by parameterized designs, ambient display elements having a warning function, for example, can also be implemented.

A further advantage of the shaped part is that the shaped part has a no-show-effect, i.e., the symbols and/or decorations are not or at least almost not recognizable to an observer when the light element is switched off. On the other hand, when the light element is switched on, the symbols and/or decorations are usually at least partially visible to an observer on the front side of the decorative layer, depending on the set light color.

One embodiment of the invention provides that the color of the respective recess, i.e., the filling color or the color of the color layer covering the recess, can only be seen by an observer if the light color emitted by the light element corresponds to this color or at least has wavelength components that are transmitted by this color, the color thus allowing light transmission for these wavelength components. The first and second colorants can be complementary colors. Correspondingly, color and complementary color of the respective recesses, and thus any patterns that may be formed by the corresponding recesses, are visible only when the corresponding color or complementary color is radiated.

One embodiment provides for the light element to be switchable at least between a first state, in which it emits the first light color, and a second state, in which it emits the second light color. In addition, in one embodiment of the invention, it can be provided that a mixed color is also possible, i.e., the emission of a mixed light color made up of first and second light colors by the light element. Additional light colors and mixtures of the different light colors can also be set. For example, it can also be provided that the light element emits white light.

According to a development, the first color and the second light color are matched to one another in such a way that the light transmission of the second light color through the first color filter is at least almost zero. Alternatively or additionally, it can be provided that the second color and the first light color are matched to one another in such a way that the light transmission of the first light color through the second color filter is at least almost zero. If both measures are implemented, it is achieved that, when the first light color is emitted by the light element, light passes at least substantially only through the first light-transmissive recesses and, when the second light color is emitted by the light element, light passes at least substantially only through the second light-transmissive recesses.

According to one embodiment of the invention, the at least one first recess forms a first symbol and/or decoration and the at least one second recess forms a second symbol and/or decoration. When the first light color is emitted, the first symbol and/or decoration is visible through the light element on the front side of the decorative layer, in particular primarily or exclusively the first symbol and/or decoration is visible on the front side of the decorative layer. When the second light color is emitted by the light element, the second symbol and/or decoration is visible on the front side of the decorative layer, in particular the second symbol is primarily or exclusively visible on the front side of the decorative layer. Here, the visibility of a symbol and/or decoration is understood in particular to mean that a symbol and/or decoration formed by the shape of this recess or these recesses is recognizable to an observer by means of one or more illuminated recesses, in particular in plan view of the front side of the decorative layer.

The symbol can be, for example, one or more functional symbols and/or geometries and/or shapes and/or one or more letters and/or letterings and/or signs and/or logos and in the case of decorations, for example, lines, in particular shape-following lines, and/or other design elements and/or patterns and/or designs which are shown on the visible side of the decorative layer of the shaped part.

One embodiment provides for this purpose that, when the first light color is emitted by the light element, the second symbol and/or decoration on the front side of the decorative layer is not visible or at least almost not visible or at least visible to a significantly weaker degree than the first symbol and/or decoration. Furthermore, it is provided that, when the second light color is emitted by the light element, the first symbol and/or decoration on the front side of the decorative layer is not visible or at least almost not visible or at least visible to a significantly weaker degree than the second symbol and/or decoration.

A development provides that the light element can emit at least one third light color, wherein the wavelength spectrum of the third light color differs from the wavelength spectrum of the first light color and the second light color, wherein the first symbol and/or decoration and the second symbol and/or decoration are visible on the front side of the decorative layer when the third light color is emitted by the light element.

One embodiment of the invention provides that the light-transmissive recesses additionally comprise at least one third light-transmissive recess. The at least one third light-transmissive recess is filled with a mixture or layering made up of the first color and the second color and/or is covered on the rear side of the decorative layer by a color layer formed by the first color and the second color or by two color layers applied one over the other, wherein one of the two color layers is formed by the first color and another of the two color layers is formed by the second color, so that the at least one third light-transmissive recess forms a third color filter for light impinging on the rear side of the decorative layer.

According to a development, the light transmission of the first light color and the second light color through the third color filter is at least almost zero.

One embodiment of the invention provides that first and second colors are complementary colors, in particular complementary colors according to the so-called Itten's color wheel. Alternatively or additionally, it can be provided that first and second light colors are complementary colors, in particular complementary colors according to the so-called Itten's color wheel.

First color and first light color can have at least substantially the same hue. Alternatively or additionally, second color and second light color can have at least substantially the same hue.

The decorative layer can have a single material layer which is opaque except for the recesses. However, it is also possible for the decorative layer to be formed from two or more layers and to comprise a transparent or translucent decorative layer on its front side and a opaque layer on its rear side, wherein the light-transmissive recesses are formed in the opaque layer. The light radiated from the rear side can pass through these recesses and then spread further up to the front side of the decorative layer due to the transparent or translucent design of the further layer or layers.

The transparent or translucent decorative layer is in particular a continuous decorative layer, i.e., the decorative layer does not have any recesses and/or perforations and/or light passages.

The opaque layer can comprise or be adhesive, in particular colored adhesive, and/or non-woven material, in particular light-blocking non-woven, and/or a film, in particular an ABS film or a PC film or a PMMA film.

The decorative layer and opaque layer can directly adjoin one another. However, it is also possible for a transparent or translucent stabilizing layer to be arranged between the decorative layer and the opaque layer. Alternatively or additionally, one or more transparent or translucent adhesive layers and/or transparent or translucent other intermediate layers can also be provided.

Preferably, the decorative layer is or comprises a wood veneer and/or a metal layer and/or plastics material and/or a film and/or a textile layer and/or a fabric and/or carbon and/or a stone layer and/or a slate layer and/or a marble layer.

Furthermore, the shaped part can have a carrier on which the decorative layer is arranged with its rear side, possibly with the color layer or color layers interposed. The light element can be arranged on a rear side of the carrier opposite the decorative layer, wherein the carrier is designed to be transparent or translucent so that the light can reach the rear side of the decorative layer. Alternatively or additionally, the light element can be arranged in the carrier, for example in a recess in the carrier. In this case, too, the carrier is designed to be transparent or translucent.

The carrier can be a plastic carrier and, for example, can be molded or cast or glued onto the color layer or color layers and/or the rear side of the decorative layer.

The light element itself can comprise one or more light sources, for example RGB LEDs. It may be provided that the light element is or comprises a light-conducting layer of the shaped part, wherein light is radiated laterally into this light-conducting layer and wherein this light-conducting layer emits the laterally radiated light at least partially onto the rear side of the decorative layer for illuminating the light-transmissive recesses of the decorative layer. The light-conducting layer can thus be a light guide which extends, in particular flatly, on the rear side of the decorative layer and into which the light is radiated laterally. The light sources of the light element, for example RGB LEDs, can thus be arranged laterally on the light-conducting layer and radiate their light laterally into the light-conducting layer. The light-conducting layer then radiates the light onto the rear side of the decorative layer for illuminating the light-transmissive recesses of the decorative layer. The light-conducting layer can be, for example, the aforementioned carrier designed to be transparent or translucent.

A transparent or translucent protective and/or optical layer can be provided on the front side of the decorative layer designed as a visible side. The protective and/or optical layer comprises, for example, lacquer or polyurethane (PUR) or plastic or is formed, for example, from a lacquer or polyurethane (PUR) or plastic.

BRIEF DESCRIPTION OF THE DRAWINGS

The invention is explained in more detail below also with regard to further features and advantages on the basis of the description of an exemplary embodiment and with reference to the accompanying schematic drawing.

FIG. 1 shows a shaped part 10 according to the invention designed as a decorative and/or panel part for the vehicle interior in a schematic sectional view.

DETAILED DESCRIPTION

The shaped part 10 comprises a decorative layer 11 with a front side 12 designed as a visible side and a rear side 13 opposite the front side 12. The decorative layer 11 comprises on its front side 12 a transparent or translucent decorative layer 14 and on its rear side 13 an opaque layer 15. Light-transmissive recesses 16a, 16b, 16c are formed in the opaque layer 15, which allow the light radiated onto the rear side 13 of the decorative layer 11 to pass through the opaque layer 15. The recesses 16a, 16b, 16c can be filled with a transparent or translucent material.

In the example shown, a transparent or translucent stabilizing layer 20, for example made of fleece and/or adhesive, is arranged between the decorative layer 14 and the opaque layer 15 on a rear side 23 of the decorative layer 14, so that the opaque layer 15 is arranged indirectly over the stabilizing layer 20 on the rear side 13 of the decorative layer 14. Alternative embodiments do not have such a stabilizing layer 20.

By way of example, a first light-transmissive recess 16a, a second light-transmissive recess 16b and a third light-transmissive recess 16c are shown schematically in FIG. 1. Cross sections through these recesses 16a, 16b, 16c, are shown, i.e., these can be, for example, lines which extend into the drawing plane and out of the drawing plane. In the example shown, the recesses 16a, 16b, 16c are basically identical except for the dimensions; they extend through the opaque layer 15 and thereby allow the light transmission. The distinction between the three recesses 16a, 16b, 16c is made on the basis of the differences with respect to the color layers 17a, 18a arranged on the rear side 13 of the decorative layer 11, the assignment of which to the corresponding recesses 16a, 16b, 16c is described below.

It is also possible for two or three of the recesses 16a, 16b, 16c shown to be a continuous, curved line and different portions of this curved line form the recesses 16a and/or 16b and/or 16c. The recesses 16a and 16b can also each be a line, and the recess 16c represents a point of intersection of these two lines. For example, the first recess 16a can form a first symbol and/or decoration that is visible on the front side 12 of the decorative layer 11 with corresponding backlighting, and the second recess 16b can form a second symbol and/or decoration that is visible on the front side 12 of the decorative layer 11 with corresponding backlighting. The recess 16c in this case can be an intersection of the first recess 16a with the second recess 16b, so that also the first and the second symbol and/or the decoration have a region of intersection provided that the recesses 16a, 16b, 16c are irradiated with light of a correspondingly suitable wavelength.

The first light-transmissive recess 16a is covered on the rear side 13 of the decorative layer 11 with a first color layer 17a formed by the first color 17, so that the first light-transmissive recess 16a forms a first color filter 19a for light impinging on the rear side 13 of the decorative layer 11. The second light-transmissive recess 16b is covered on the rear side 13 of the decorative layer 11 with a second color layer 18a formed by a second color 18, so that the second light-transmissive recess 16b forms a second color filter 19b for light impinging on the rear side 13 of the decorative layer 11. The third light-transmissive recess 16c is initially covered on the rear side 13 of the decorative layer 11 by the first color layer 17a and then by the second color layer 18a, so that the third light-transmissive recess 16c forms a third color filter 19c for light impinging on the rear side 13 of the decorative layer 11. The first color 17 and the second color 18 are different colors, for example complementary colors. Accordingly, the three color filters 19a, 19b, 19c differ with respect to the wavelength spectrum that is blocked by them and passed through them. The color layers 17a, 18a are formed, for example, by colored films. However, they can also be printed color layers 17a, 18a, for example.

A transparent or translucent carrier 21 is arranged on the rear side 13 of the decorative layer 11. The carrier 21 can be, for example, injection-molded or cast or glued. In the region of the color layers 17a, 18b, this carrier 21 adjoins the color layers 17a or 18a, in regions without color layers 17a, 18a, it adjoins the rear side 13 of the decorative layer 11, and an adhesive layer can optionally additionally be provided in all or individual regions (not shown).

The depiction of carriers 21 and color layers 17a, 18a in FIG. 1 is to be understood schematically and is intended to illustrate the structure of the shaped part 10. In actual shaped parts, the carrier 21 is adapted to the rear-side shape predetermined by the rear side 13 of the decorative layer 11 and color layers 17a, 18b and is directly adjacent thereto, so that the free space present in the schematic representation of FIG. 1 is omitted. For example, two color layers can in principle be within one plane and thereby span or even completely or partially penetrate the respective light-transmissive recesses and correspondingly completely or partially fill them with their corresponding color, which, however, does not necessarily have to be the case, for example in the case of color layers formed by films. The color layers can all be arranged in this case next to one another in one plane. However, as shown schematically in FIG. 1, it is also possible for the color layers to partially overlap and thus form a layered structure in the overlapping region, which structure can also span a third light-transmissive recess, as shown. It is possible for the colors to mix at least partially in the overlapping region, for example in the case of printed color layers, but it is also possible—as shown—for the color layers to remain in a layered structure, for example in the case of color layers formed by films or also in the case of printed color layers.

A light element 24 is arranged on a rear side 22 of the carrier 21 and emits light onto the rear side 13 of the decorative layer 11 for illuminating the light-transmissive recesses 16a, 16b, 16c of the decorative layer 11. Alternatively, the light element could also be or comprise a light-conducting layer of the shaped part, for example the carrier 21 shown in FIG. 1. Light could then be radiated laterally into this light-conducting layer, for example the carrier 21, for example by one or more RGB LEDs as a light source of the light element. The light-conducting layer then radiates the laterally irradiated light at least partially onto the rear side 13 of the decorative layer 11 for illuminating the light-transmissive recesses 16a, 16b, 16c of the decorative layer 11.

The light element 24 is a dual- or multispectral light element 24 which can emit at least one first light color and one second light color, wherein the wavelength spectrum of the first light color differs from the wavelength spectrum of the second light color. For example, the light element 24 can be switchable for this purpose at least between a first state, in which it emits the first light color, and a second state, in which it emits the second light color.

The first color 17 and thus the first color filter 19a is matched to the first and second emitted light color of the light element 24 in such a manner that the light transmission for the first light color is greater than for the second light color. Conversely, the second color 18 and thus the second color filter 19b is matched to the first and second light colors that can be emitted by the light element 24 such that the light transmission for the second light color is greater than for the first light color.

In particular, it can be provided that the first color 17 and the second light color are matched to one another in such a way that the light transmission of the second light color through the first color filter 19a is at least almost zero, and that the second color 18 and the first light color are matched to one another in such a way that the light transmission of the first light color through the second color filter 19b is at least almost zero. In this case, when the first light color is emitted by the light element 24, the first symbol and/or decoration on the front side 12 of the decorative layer 11 is visible, while the second symbol and/or decoration is not visible or at least hardly visible. Conversely, when the second light color is emitted by the light element 24, the second symbol and/or decoration on the front side 12 of the decorative layer 11 is visible, while the first symbol and/or decoration is not visible or at least hardly visible. Due to the overlap of the two color layers 17a, 18b in the region of the third recess 16c, in this case the third color filter 19c can block the transmission of both the first light color and the second light color. If this is a region of intersection of first and second symbol and/or decoration, this region of intersection on the front side 12 of the decorative layer 11 appears dark or black.

For example, the first color and the first light color can be "red" and the second color and the second light color can be "blue". If the red first light color is generated by the light element 24, the first color filter 19a allows the light to pass through, while the second color filter 19b and also the third color filter 19c block the light. Thus, in this case, the first symbol and/or decoration is visible in red color on the front side 12 of the decorative layer 11, whereas the second symbol and/or decoration does not appear or hardly appears; the region of the front side 12 associated with the third recesses 16c also appears dark. If the blue second light color is generated by the light element 24, the second color filter 19b allows the light to pass through, while the first color filter 19a and also the third color filter 19c block the light. In this case, the second symbol and/or decoration is thus visible in blue color on the front side 12 of the decorative layer 11, whereas the first symbol and/or decoration does not appear or hardly appears; the region of the front side 12 associated with the third recesses 16c also appears dark. If a mixed light or another light color is generated by the light element 24, it depends on the wavelength spectrum of this light color and the transmission spectrum of the color filters 19a, 19b, 19c in which brightness and which color which symbol and/or decoration and also the intersection region to be assigned to the third recesses are visible on the front side 12 of the decorative layer 11. It is possible, for example, for both symbols to be visible in different colors; in addition the region of intersection may in some cases also have another color. By corresponding variation of the light color generated by the light element 24, changing designs on the front side 12 of the decorative layer can thus be realized.

LIST OF REFERENCE SIGNS

10 Shaped part
11 Decorative layer
12 Front side (decorative layer)
13 Rear side (decorative layer)
14 Decorative layer
15 Opaque layer
16a First light-transmissive recess
16b Second light-transmissive recess
16c Third light-transmissive recess
17 First color
17a First color layer
18 Second color
18a Second color layer
19a First color filter
19b Second color filter
19c Third color filter
20 Stabilizing layer
21 Carrier
22 Rear side (carrier)
23 Rear side (decorative layer)
24 Light element

We claim:
1. A shaped part for a vehicle, the shaped part forming a decorative part or panel for the vehicle, comprising:
a decorative layer having a front side designed as a visible side and a rear side opposite the front side, wherein the decorative layer is designed to be opaque except for light-transmissive recesses in the decorative layer for light impinging on the rear side of the decorative layer, and
at least one light element which emits light onto the rear side of the decorative layer for illuminating the light-transmissive recesses of the decorative layer,
wherein:
the light-transmissive recesses comprise at least one first light-transmissive recess and at least one second light-transmissive recess,
the at least one first light-transmissive recess is filled with a first color and/or is covered on the rear side of the decorative layer with a first color layer formed by the first color, so that the at least one first light-transmissive recess forms a first color filter for light impinging on the rear side of the decorative layer,
the at least one second light-transmissive recess is filled with a second color and/or is covered on the rear side of the decorative layer with a second color layer formed by the second color, so that the at least one second light-transmissive recess forms a second color filter for light impinging on the rear side of the decorative layer,
the light element is a dual- or multispectral light element which emits at least one first light color and at least one second light color into both the at least one first light-transmissive recess and the at least one second light-transmissive recess at the same time, wherein the wavelength spectrum of the first light color differs from the wavelength spectrum of the second light color,
the light transmission of the first color filter is greater for the first light color than for the second light color, and
the light transmission of the second color filter is greater for the second light color than for the first light color
wherein the first color layer does not overlap with the second color layer at the first and second light-transmissive recesses, whereas the first color layer and the second color layer overlap at a third light-transmissive recess.

2. The shaped part according to claim 1, wherein:
the light element is switchable at least between a first state, in which it emits the first light color, and a second state, in which it emits the second light color.

3. The shaped part according to claim 1, wherein:
that the first color and the second light color are matched to one another in such a way that the light transmission of the second light color through the first color filter is at least almost zero, and/or
that the second color and the first light color are matched to one another in such a way that the light transmission of the first light color through the second color filter is at least almost zero.

4. The shaped part according to claim 1, wherein:
the at least one first recess forms a first symbol and/or decoration, and the at least one second recess forms a second symbol and/or decoration, wherein the first symbol and/or decoration is visible on the front side of the decorative layer when the first light color is radiated by the light element, and wherein the second symbol and/or decoration is visible on the front side of the decorative layer when the second light color is radiated by the light element.

5. The shaped part according to claim 1, wherein:

when the first light color is emitted by the light element, the second symbol and/or decoration on the front side of the decorative layer is not visible or at least almost not visible or at least significantly less visible than the first symbol and/or decoration, and when the second light color is emitted by the light element, the first symbol and/or decoration on the front side of the decorative layer is not visible or at least almost not visible or at least significantly less visible than the second symbol and/or decoration.

6. The shaped part according to claim 1, wherein:

the light transmission of the first light color and the second light color is at least almost zero through the third color filter.

7. The shaped part according to claim 1 wherein:

that the first color and the second color are complementary colors, and/or the first and second light colors are complementary colors.

8. The shaped part according to claim 1, wherein:

that the first color and the first light color have at least substantially the same hue, and/or the second color and the second light color have at least substantially the same hue.

9. The shaped part according to claim 1, wherein:

the decorative layer on its front side comprises a transparent or translucent decorative layer and comprises an opaque layer on its rear side, wherein the light-transmissive recesses are formed in the opaque layer.

10. The shaped part according to claim 1, wherein:

the light element is or comprises a light-conducting layer of the shaped part, wherein light is radiated laterally into this light-conducting layer, and wherein this light-conducting layer emits the laterally radiated light at least partially onto the rear side of the decorative layer for illuminating the light-transmissive recesses of the decorative layer.

11. The shaped part according to claim 4, wherein:

the light element can emit at least a third light color, wherein the wavelength spectrum of the third light color differs from the wavelength spectrum of the first light color and the second light color, wherein the first symbol and/or decoration and the second symbol and/or decoration are visible on the front side of the decorative layer when the third light color is emitted by the light element.

* * * * *